US006651291B2

United States Patent
Lim

(10) Patent No.: US 6,651,291 B2
(45) Date of Patent: Nov. 25, 2003

(54) WIPER ASSEMBLY CAPABLE OF ADJUSTING A WIPING ANGLE

(75) Inventor: Keun-Sik Lim, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 23 days.

(21) Appl. No.: 10/020,196

(22) Filed: Dec. 18, 2001

(65) Prior Publication Data

US 2002/0108200 A1 Aug. 15, 2002

(30) Foreign Application Priority Data

Dec. 19, 2000 (KR) .......................................... 2000-78802

(51) Int. Cl.[7] ................................. B60S 1/24; B60S 1/18
(52) U.S. Cl. ...................... 15/250.13; 15/250.3; 74/43; 74/522; 74/600; 74/828
(58) Field of Search ........................... 15/250.13, 250.3, 15/250.31, 250.27, 250.16, 250.17; 74/600, 602, 42, 43, 522, 828, 837, 829

(56) References Cited

U.S. PATENT DOCUMENTS

| 4,466,153 A | * | 8/1984 | Seibicke .................. 15/250.16 |
| 5,090,081 A | * | 2/1992 | Yamamoto et al. ...... 15/250.13 |
| 5,142,728 A | * | 9/1992 | Yamamoto et al. ...... 15/250.13 |
| 5,142,729 A | * | 9/1992 | Imamura ................. 15/250.13 |
| 5,287,585 A | * | 2/1994 | Yamamoto et al. ...... 15/250.13 |
| 5,333,351 A | * | 8/1994 | Sato ........................ 15/250.13 |

FOREIGN PATENT DOCUMENTS

JP 0141148 * 6/1989 .............. 15/250.13

* cited by examiner

*Primary Examiner*—Gary K. Graham
(74) *Attorney, Agent, or Firm*—Antonelli, Terry, Stout & Kraus, LLP

(57) ABSTRACT

The present invention relates to a wiper assembly capable of adjusting a wiping angle, which changes the rotating angle of drive arms in accordance with the change of the operating mode (high-speed operating mode or low-speed operating mode) of a wiper assembly by means of an auxiliary motor so that the wiping angle can be properly changed. The wiper assembly capable of adjusting a wiping angle comprises an auxiliary motor mounted on a main frame and having a variable crankshaft for moving the center axis of the variable crankshaft from one position (P1) to another position (P2); and a variable link of which the first end is operatively coupled to one end of the variable crankshaft and the second end is coupled to the first connecting rod, the second connecting rod coupled to one drive arm, and a link rod coupled to the other drive arm. The variable link moves the location of drive arms between the points in accordance with the movement of a pivot (C1 or C2) occurred by operating of the variable crank.

2 Claims, 3 Drawing Sheets

WIPER ASSEMBLY CAPABLE OF ADJUSTING A WIPING ANGLE

BACKGROUND OF THE INVENTION

1. Field of the Invention

The present invention relates to a wiper assembly capable of adjusting a wiping angle, and more particularly, to a wiper assembly capable of adjusting a wiping angle by employing an auxiliary motor to adjust the operating angle of drive arms in accordance with the change of a wiper operating mode (high-speed operating mode or low-speed operating mode) so that the wiping angle is properly adjusted in response to the operating condition of wiper assembly.

2. Description of the Prior Art

In a motor vehicle, a front windshield is provided to prevent the inflow of precipitation and/or wind while driving. When dirt and other forms of debris are accumulated on the front windshield, a driver would have a trouble in securing a clean visual field through the windshield. Especially, when driving in a region where in rain or snowfall is occurring, the precipitation accumulating on the front windshield should be rapidly removed in order to secure a clean visual field.

Thus, a motor vehicle is provided with a wiper assembly for securing a clean visual field, capable of removing dirt and/or precipitation accumulating on the front windshield.

FIG. 1 is a perspective view showing a conventional wiper assembly.

As shown in FIG. 1, the conventional wiper assembly comprises a wiper motor (2), a crank arm (4), a drive arms (14, 16), a first connecting rod (6) disposed between the crank arm (4) and the drive arm (14) for converting a rotating motion of the crank arm into a reciprocal motion of the drive arm (14), and a second connecting rod (8) transferring the driving force of the wiper motor to a pivot (10) by means of the drive arm (16).

As shown in FIG. 2, a wiper arm (18, 18') and a wiper blade are connected to the pivot (10) and (12), respectively.

In the above arrangement, beginning with the crank arm (4) rotated by the wiper motor (2), the driving force of the wiper motor (2) is transferred to the drive arms (14) and (16) by means of the first connecting road (6) and the second connecting rod (8). Subsequently, the pivots (12) and (10) connected to the drive arms (14) and (16), are rotated, whereby the wiper arms (18, 18') and wiper blades connected to the pivots are rotated for removing dirt and precipitation being accumulated on the front windshield. In FIG. 1, a1 and a2 indicate the wiping angle of a conventional wiper assembly.

In the above-described conventional wiper assembly, the wiper arms normally reciprocate within the predetermined wiping angles (a1, a2) in low-speed operating mode of the wiper assembly. If the wiper assembly, however, is operated in high-speed operating mode, the wiping angle of the wiper arms exceeds the predetermined angles (a1, a2) due to the inertial force incurred by high-speed operation resulting in the interference with front pillars or a cowl cover.

Furthermore, in the high-speed operating mode, the noise generated from a wiper blade when the direction of the wiper arm is reversed, is increased due to the increase of a wiping angle and inertial force. As a result, the discontent against the noise is frequently voiced among customers.

SUMMARY OF THE INVENTION

In view of the foregoing state of the prior art, the present invention provides a wiper assembly capable of adjusting a wiping angle, which adjust a wiping angle in high-speed operation mode of the wiper assembly in order to not only prevent a wiper blade from interfering with front pillars or a cowl cover, but also to decrease reversion-noise generated from the wiper blades.

In order to achieve the above performance, a wiper assembly capable of adjusting a wiping angle according to the present invention, comprises a main frame mounted on the body of a vehicle by means of a plurality of fixing holes, a wiper motor installed to the main frame, the first connecting rod and the second connecting rod transferring the driving force of the motor to drive arms, wiper arms and wiper blades connected to the drive arms through the pivots, is characterized by an auxiliary motor mounted on the frame, having a variable crankshaft for moving the center axis of the variable crankshaft from position P1 to position P2, and a variable link of which the first end is operatively coupled to the one end of the variable crankshaft and the second end is coupled to the first connecting rod, the second connecting rod coupled to one drive arm, and a link rod coupled to the other drive arm, wherein the variable link moves the location of drive arms from P1' to P2' or from P2' to P1' in accordance with the movement of a pivot (C1 or C2) occurred by operating of the variable crank.

BRIEF DESCRIPTION OF THE ACCOMPANYING DRAWINGS

The above performance and features of the present invention will become apparent from the following description of the invention, when taken in conjunction with the accompanying drawings, in which.

---

Figure 1:
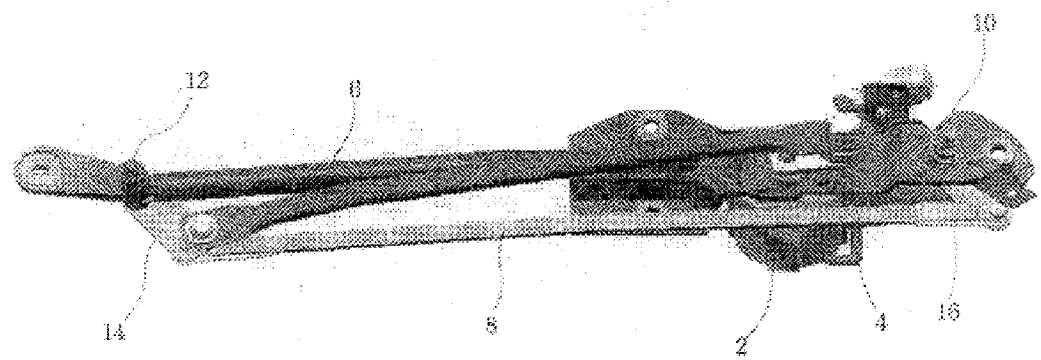
FIG. 1 is a perspective view of a conventional wiper assembly.
Figure 2:
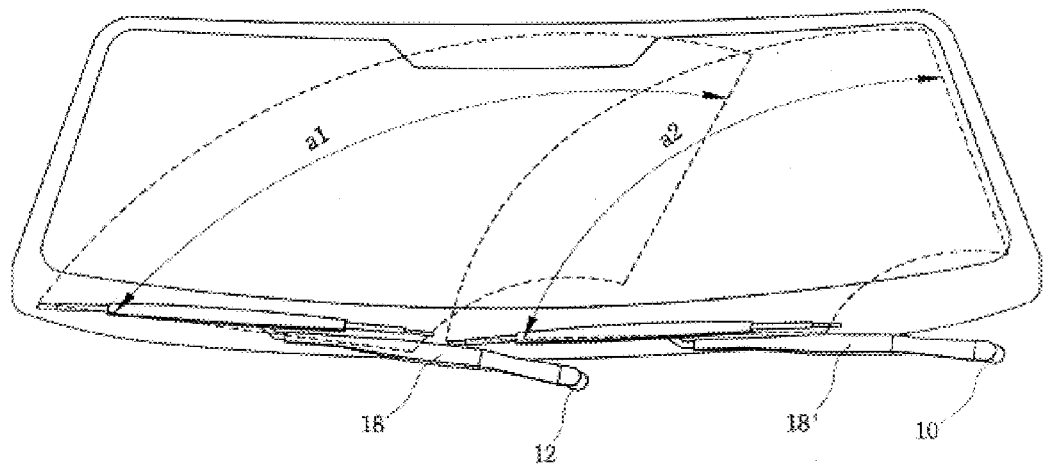
FIG. 2 is a schematic view showing the wiping range of a conventional wiper assembly.

20: wiper motor
21: frame
22: first connecting rod
22': second connecting rod
23: fixing holes
26, 34, 36': pins
30: variable link
32: link rod
40: auxiliary motor
44: variable crankshaft
50, 50': drive arms
52, 52': pivot
54: wiper arm
56: wiper blade

---

DETAILED DESCRIPTION OF THE INVENTION

Hereinafter, the present invention will be described in detail by an embodiment with the accompanying drawings, especially FIG. 3, FIG. 4 and FIG. 5.

Figure 3:
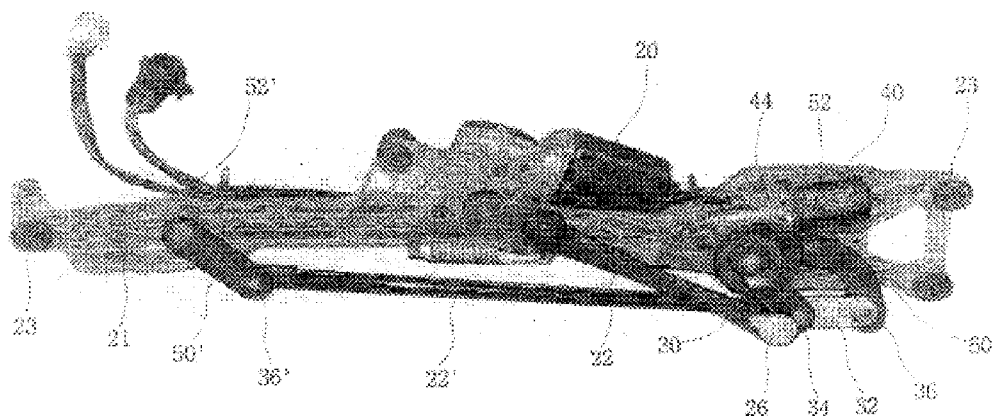
FIG. 3 is a perspective view of wiper assembly capable of adjusting a wiping angle according to the present invention.

As shown in FIG. 3, a wiper assembly according to the present invention is basically provided with a main frame (21) mounted on the body of a vehicle by means of a plurality of fixing holes (23), a wiper motor (20) installed to the main frame (21), the first connecting rod (22) and the second connecting rod (22') transferring the driving force of the motor (20) to drive arms (50, 50'), wiper arms connected to the drive arms through the pivot (52, 52'), and wiper blades.

Furthermore, a rubber damper is inserted into the fixing holes (23) of the main frame (21) in order to prevent vibration and shock from being transferred to the body of a vehicle.

One end of the drive arm (50') is coupled to the second connecting rod (22') by means of a pin (36'), and the other end of the drive arm (50') is connected to the pivot (52').

In the above arrangement, the embodiment according to the present invention additionally comprises an auxiliary motor (40) equipped with a variable crankshaft (44), and a variable link (30) capable of changing the location of drive arm (50) in response to the operation of the variable crankshaft (44) so that the wiping angle can be properly changed in accordance with the operating mode of the wiper assembly (high-speed operating mode or low-speed operating mode).

Figure 4:
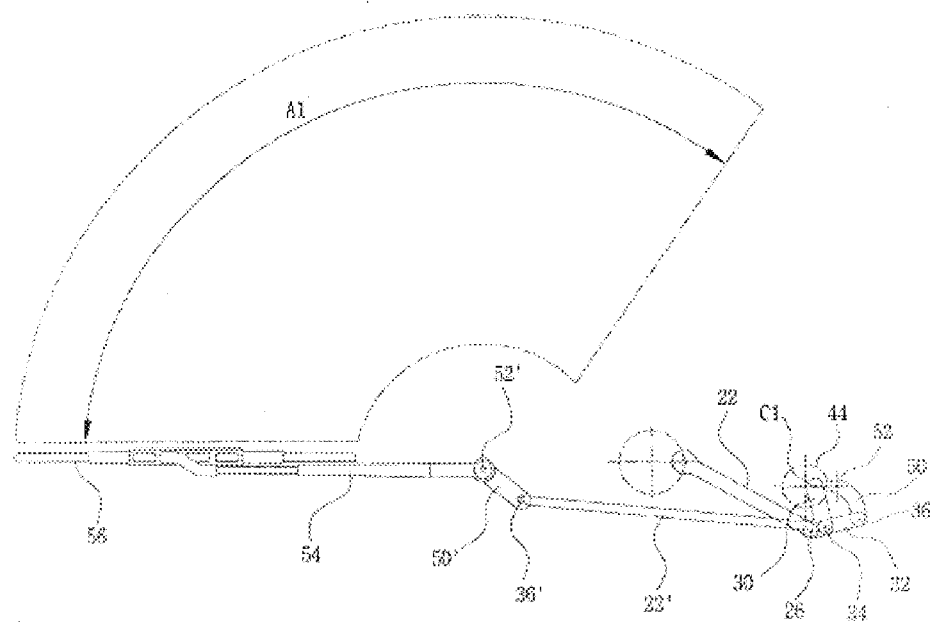
FIG. 4 is schematic view showing the wiping range of wiper assembly capable of adjusting a wiping angle in a high-speed operating mode.
Figure 5:
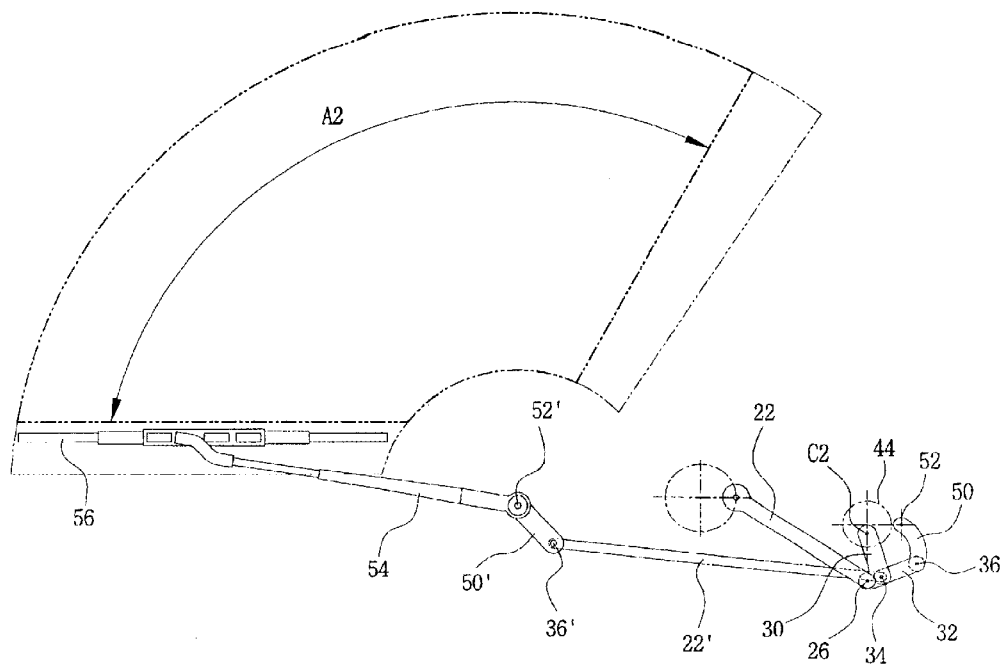
FIG. 5 is schematic view showing the wiping range of wiper assembly capable of adjusting a wiping angle in a low-speed operating mode.

In FIG. 4 and FIG. 5, only one wiper arm and wiper blade are shown even though two wiper arms and wiper blades are employed in actual use.

As shown in FIG. 4 and FIG. 5, the variable crankshaft (44) of the auxiliary motor (40) is configured to have different center axis in accordance with the operating mode of the wiper assembly, whereby the location of the variable link (30) is accordingly changed.

The first end of the variable link (30) is connected to the variable crankshaft (44), and the second end is coupled to the first connecting rod (22) and the link rod (32) by means of pins (26, 34), respectively.

Furthermore, the link rod (32) is coupled to the drive arm (50) by pin (36), wherein the one end of the drive arm (50) is connected to the pivot (52). The wiper arm and wiper blade (not shown) are attached to the pivot (52).

Furthermore, one end of the second connecting rod (22') is coupled to the pin connection part where the link rod (32) is coupled to the variable link (30) by pin (34), wherein the other end of the second connecting rod is coupled to the drive arm (50') connected to the pivot (52') by means of a pin (36'). The wiper arm (54) and wiper blade (56) are attached to the pivot (52').

As shown in FIG. 4, in the low-speed operating mode of the wiper assembly, the driving force of the wiper motor (20) is orderly transferred to the first connecting rod (22), the variable link (30), the second connecting rod (22'), and the drive arm (50'), whereby the wiper arm (54) and the wiper blade (56) reciprocate within the range A1.

In the low-speed operating mode, the pivot of the variable link (30) is configured to C1.

As shown in FIG. 5, in the high-speed operating mode of the wiper assembly, the pivot of the variable link (30) is moved to C2 as the variable crankshaft (44) is rotated by the operation of the auxiliary motor. Accordingly, the movements of the variable link (30) and other member associated therewith are occurred resulting in limiting the wiping angle of the wiper arm (54) and the wiper blade (56) within the range A2.

In actual operation, the wiper arm (54) and the wiper blade (56), however, reciprocate within the range A1 due to the inertial force incurred by high-speed operation.

With the present invention arranged as set forth above, the drawbacks, interference of the wiper blades with a front pillar and/or a cowl panel and reversion noise generated from the wiper blade, can be overcome.

Figure 6:
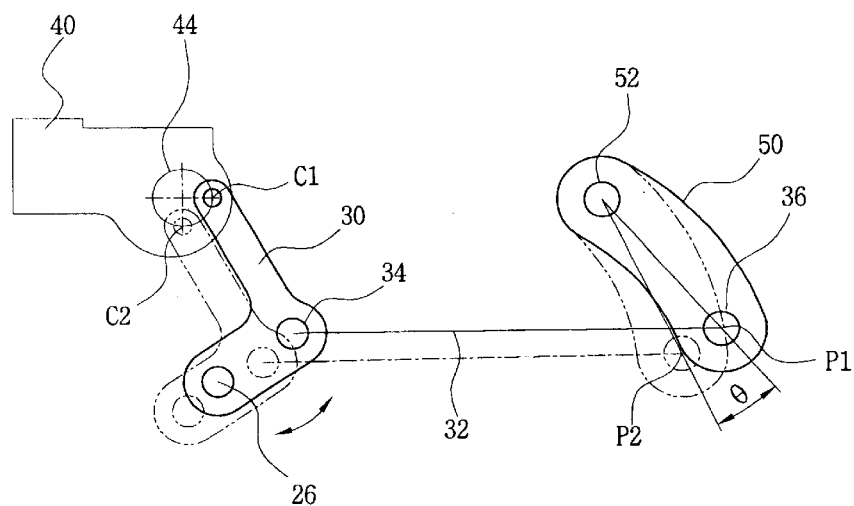
FIG. 6 is schematic view showing the principle of adjusting a wiping angle according to the present invention.

FIG. 6 is schematic view showing the principle of adjusting a wiping angle according to the present invention.

As shown in FIG. 6, the center axis of the variable crankshaft (44) is moved from the first position (P1) to the second position (P2) as the variable crankshaft (44) is rotated by the auxiliary motor (40). Subsequently, not only the pivot of the variable link (30) is moved from C1 to C2, but also the pin connection point where the drive arm (50) is coupled to the link rod (32) by means of the pin (36) is moved from P1 to P2. As the result of the variation by "0" in position of the drive arm (50), the initial positions of the wiper arm and the wiper blade connected to the drive arm (50) are changed in proportion to the variation, whereby a wiping angle is changed.

Even though the above embodiment only discloses adjusting the wiping angle of one drive arm (50), it is easily understood that the adjustment of the other drive arm (50') can be realized by same manner.

The present invention may be embodied in other specific forms without departing from its spirit or essential characteristics.

What is claimed is:

1. A wiper assembly for adjusting a wiping angle comprising:
   a main frame mounted on a body of a vehicle by means of a plurality of fixing holes;
   a wiper motor installed to the main frame;
   a first connecting rod and a second connecting rod transferring a driving force of the motor to drive arms, a wiper arm and a wiper blade connected to the drive arms through a pivot;
   an auxiliary motor mounted on the main frame including a variable crankshaft for moving a center axis of the variable crankshaft from one crankshaft position to another crankshaft position; and
   a variable link with a first end coupled to one end of the variable crankshaft and a second end coupled to the first connecting rod, the second connecting rod being coupled to one drive arm of the drive arms, and a link rod coupled to another drive arm of the drive arms; and wherein
   the variable link moves a location of the drive arms between one location of the drive arms and another location of the drive arms in accordance with movement of a pivot produced by operating the variable crankshaft.

2. The wiper assembly according to claim 1, wherein:
   displacement of the locations of the drive arms is proportional to displacement of the crankshaft positions of the center axis of the variable crankshaft.

* * * * *